(12) United States Patent
Järvi et al.

(10) Patent No.: US 12,202,534 B2
(45) Date of Patent: Jan. 21, 2025

(54) WHEELED TRANSPORT DEVICE

(71) Applicant: K. Hartwall Oy Ab, Söderkulla (FI)

(72) Inventors: Mikko Järvi, Söderkulla (FI); Markku Tiilikainen, Söderkulla (FI)

(73) Assignee: K. Hartwall Oy Ab, Söderkulla (FI)

( * ) Notice: Subject to any disclaimer, the term of this patent is extended or adjusted under 35 U.S.C. 154(b) by 448 days.

(21) Appl. No.: 17/577,080

(22) Filed: Jan. 17, 2022

(65) Prior Publication Data

US 2023/0227091 A1 Jul. 20, 2023

(51) Int. Cl.
*B62B 5/04* (2006.01)
*B60B 33/00* (2006.01)

(52) U.S. Cl.
CPC ........ *B62B 5/0457* (2013.01); *B60B 33/0081* (2013.01); *B60B 33/0094* (2013.01); *B62B 5/0447* (2013.01); *B60B 2200/43* (2013.01)

(58) Field of Classification Search
CPC ............ B60B 33/0081; B60B 33/0094; B60B 2200/43; B60B 33/021; B60B 2200/242; B62B 3/002; B62B 5/061; B62B 5/0414; B62B 5/0442; B62B 5/0447; B62B 5/0457; B62B 5/0485; B62B 2301/0467; B62B 2301/04632; B62B 5/0438; B62B 5/0433; B62B 5/04; A61G 1/04; A61G 1/0243; A61G 5/101; A61G 5/1018; A61G 5/1037; A61G 7/0528; A61G 2007/0528
USPC .................................................. 188/1.12, 29
See application file for complete search history.

(56) References Cited

U.S. PATENT DOCUMENTS

| | | | | |
|---|---|---|---|---|
| 4,175,783 A | * | 11/1979 | Pioth | A61G 7/0528 296/20 |
| 4,205,413 A | * | 6/1980 | Collignon | A61G 1/0243 16/35 D |
| 4,276,962 A | * | 7/1981 | Aulik | B62B 5/04 188/29 |
| 4,852,697 A | * | 8/1989 | Kulik | A61G 5/1037 188/29 |
| 6,102,167 A | | 8/2000 | Chiu | |

FOREIGN PATENT DOCUMENTS

| | | |
|---|---|---|
| DE | 29819811 U1 | 1/1999 |
| DE | 102019118305 A1 | 3/2020 |
| FR | 3085338 A1 | 3/2020 |
| JP | 6488227 B2 * | 3/2019 |

OTHER PUBLICATIONS

English machined translation of FR-3085338 A1, Mar. 6, 2020.*

* cited by examiner

*Primary Examiner* — Robert A. Siconolfi
*Assistant Examiner* — San M Aung
(74) *Attorney, Agent, or Firm* — Laine IP Oy

(57) ABSTRACT

According to a first aspect of the present disclosure, there is provided a wheeled transport device featuring at least one castor which has a wheel and a brake system which has a contact member with one opening which is defined by an edge. The contact member is configured to be manipulated between an applied state, where the edge is in contact with the wheel, and a released state where the edge is not in contact with the wheel.

21 Claims, 13 Drawing Sheets

WHEELED TRANSPORT DEVICE

FIELD

The present invention relates to logistics equipment, in particular to wheeled transport devices. More specifically, the disclosure relates to a wheeled transport device with a braking mechanism.

BACKGROUND

Wheeled transport devices or roller containers for distributing products from one location to another are common in warehouses and other commercial facilities. Wheeled transport devices may have braking mechanisms to allow for convenient user control while transporting.

Some varieties of wheeled transport devices have a braking mechanism which are applied by the wheeled transport device operator applying pressure by foot on a brake near the wheel of the wheeled transport device. Other varieties of wheeled transport devices have a braking mechanism which engages automatically by the operator manipulating a handle, for example. Especially for wheeled transport devices that use a foot engaging brake for swivel wheels, the method for engaging the brake is inconvenient and inefficient in terms of time. There is therefore a need to improve the braking mechanism to allow for convenient brake engagement for swivel wheels.

SUMMARY OF THE INVENTION

A novel wheeled transport device is therefore herein proposed.

The invention is defined by the features of the independent claims. Some specific embodiments are defined in the dependent claims. According to a first aspect of the present disclosure, there is provided a wheeled transport device featuring at least one castor which has a wheel and a brake system which has a contact member with one opening which is defined by an edge. The contact member is configured to be manipulated between an applied state, where the edge is in contact with the wheel, and a released state where the edge is not in contact with the wheel.

One or more embodiments may include one or several features from the following itemized list:
- the brake system comprises a release mechanism configured to selectively manipulate the brake system to the released state;
- the at least one castor is a swivel castor, and wherein the castor is aligned or centered with respect to the opening so that the edge can engage the wheel in each orientation of the at least one castor while the brake system is in the applied state;
- the wheel comprises a running surface and wherein the edge is mechanically in contact with the running surface while in the applied state, and wherein the edge is at a distance from the running surface while in the released state;
- the running surface partially extends through the opening in the applied state;
- the castor comprises a fork which extends, at least partially, through the opening;
- the release mechanism is connected to the contact member via a motion converter such that the motion converter allows the contact member to be manipulated between the applied state and the released state;
- the motion converter is configured to rotate and cause the contact member to be manipulated between the applied state and the released state;
- the release mechanism comprises a hinge mechanism configured to rotate the contact member between the applied state and the released state;
- the wheeled transport device comprises one contact member, and at least two swivel wheels, wherein the contact member is configured to engage with the at least two swivel wheels;
- the edge comprises a replaceable brake pad;
- the brake pad spans between 5% and 40% of the perimeter of the edge;
- the wheeled transport device comprises a first handle at one end of the wheeled transport device configured to manipulate the release mechanism;
- the wheeled transport device comprises a second handle at another end of the wheeled transport device configured to manipulate the release mechanism;
- the wheel comprises a wheel axle, and wherein the applied state of the contact member further comprises a fully engaged mode, the contact member exerts a first braking force onto the running surface, and a relieved mode, in which the contact member exerts a second braking force onto the running surface, which second braking force is less than the first braking force;
- the first handle and the second handle are configured to modulate the brake system between the fully engaged mode and the relieved mode;
- the brake system is configured to default into the applied state;
- the brake system comprises a biasing mechanism connected to the contact member, wherein the biasing mechanism is configured to bias the contact member to the applied state;
- the biasing mechanism comprises a biasing mechanism first end and a biasing mechanism second end, where the biasing mechanism first end is connected to the contact member, where the biasing mechanism second end is connected to a frame, and where the biasing mechanism is configured to bias the contact member relative to the frame;
- the release mechanism comprises a shaft, which is connected to a first transmission line and a first handle. The shaft is connected to a second transmission line and a second handle at a second shaft end. The second handle is configured to manipulate the release mechanism to manipulate the brake system between the released state and the applied state, and
- the shaft is configured to cause the motion converter to be toggled between a impacting released state and an impacting applied state.

Considerable benefits are gained with the aid of the novel wheeled transport device. The brake system ensures that the wheeled transport device is stationary when not in use. The brake system may also ensure that the wheels of the wheeled transport device have brakes applied while the wheel is in any orientation. Especially with swivel wheels, the brake system ensures that swivel wheels have brakes applied while the swivel wheels are in any orientation.

An operator may operate the wheeled transport device via a handle and manipulate the brake system between applied and released states, where the brake system is automatically applied when the handle is released. The benefit of automatically engaging the brake system is that the operator can complete other tasks without having to manually apply a brake, and thus improve efficiency for handling goods.

Further, the operator may load objects onto the wheeled transport device and if there is lateral force from the loading, the brake system ensures that the wheeled transport device is stationary. The auto-engaging brake system ensures that when the operator is away from the wheeled transport device, the wheeled transport device is secured and not prone to unintentional movement of the wheeled transport device due to the wheeled transport device being on a sloped surface for example. If the operator loses control, unintentionally releases the grip of the handle, or trips, the brake system may be automatically engaged. Unintentional movement of the wheeled transport device could cause serious injury to personnel and other people and may also damage surrounding objects causing unsafe situations and monetary losses.

While in use, the operator may use the handle to manipulate the brake system in a state where the brake is applied but the wheels of the wheeled transport device can still roll on the ground. As a result, this state allows the operator to apply the brakes slightly to control the braking force on the wheels. This is especially useful when the operator is transporting the wheeled transport device down a sloped surface and the operator wishes to slow down the travelling speed if, for example, there is a heavy load on the wheeled transport device.

The novel wheeled transport device may have a platform which has a height relative to the ground which may be lower than most roll containers. This is due to the low orientation of the brake system which does not obstruct the installment of the platform, as the platform may be installed on top of a top surface of a castor. This adds extra height to the wheeled transport device for mounting objects.

BRIEF DESCRIPTION OF THE DRAWINGS

In the following certain exemplary embodiments are described in greater detail with reference to the accompanying drawings, in which.

EMBODIMENTS

In the present context, a wheeled transport device refers to a vehicle suitable for transporting goods. An "operator" refers to a worker, personnel, or person who uses the wheeled transport device. On a general level, the proposed construction is based on the idea of providing a means to automatically apply a brake to a wheel, especially a swivel wheel, in any orientation of the wheel or swivel wheel. Further, the operator may manipulate a handle in order to manually control the brake force applied to the wheel.

Figure 1A:
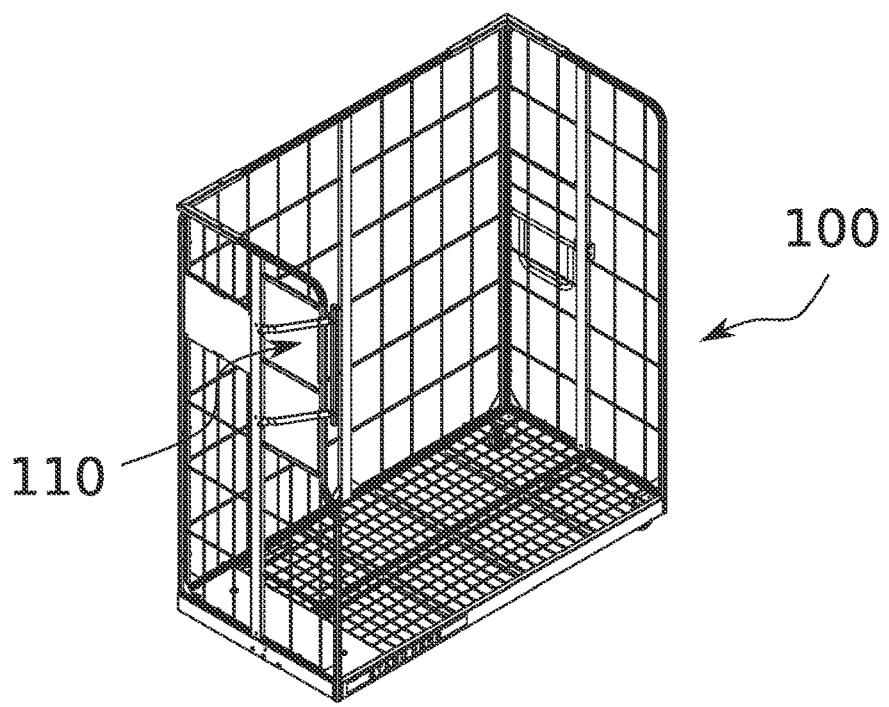
FIG. 1A illustrates a perspective view of a wheeled transport device in accordance with at least some embodiments in an applied state.
Figure 1B:
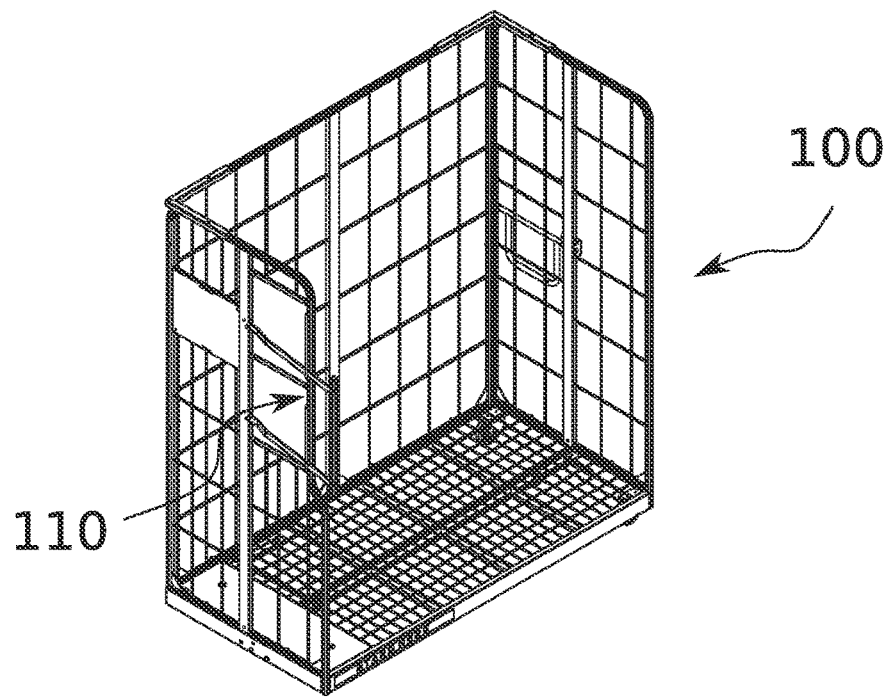
FIG. 1B illustrates a perspective view of the wheeled transport device of FIG. 1A in a released state.
Figure 2A:
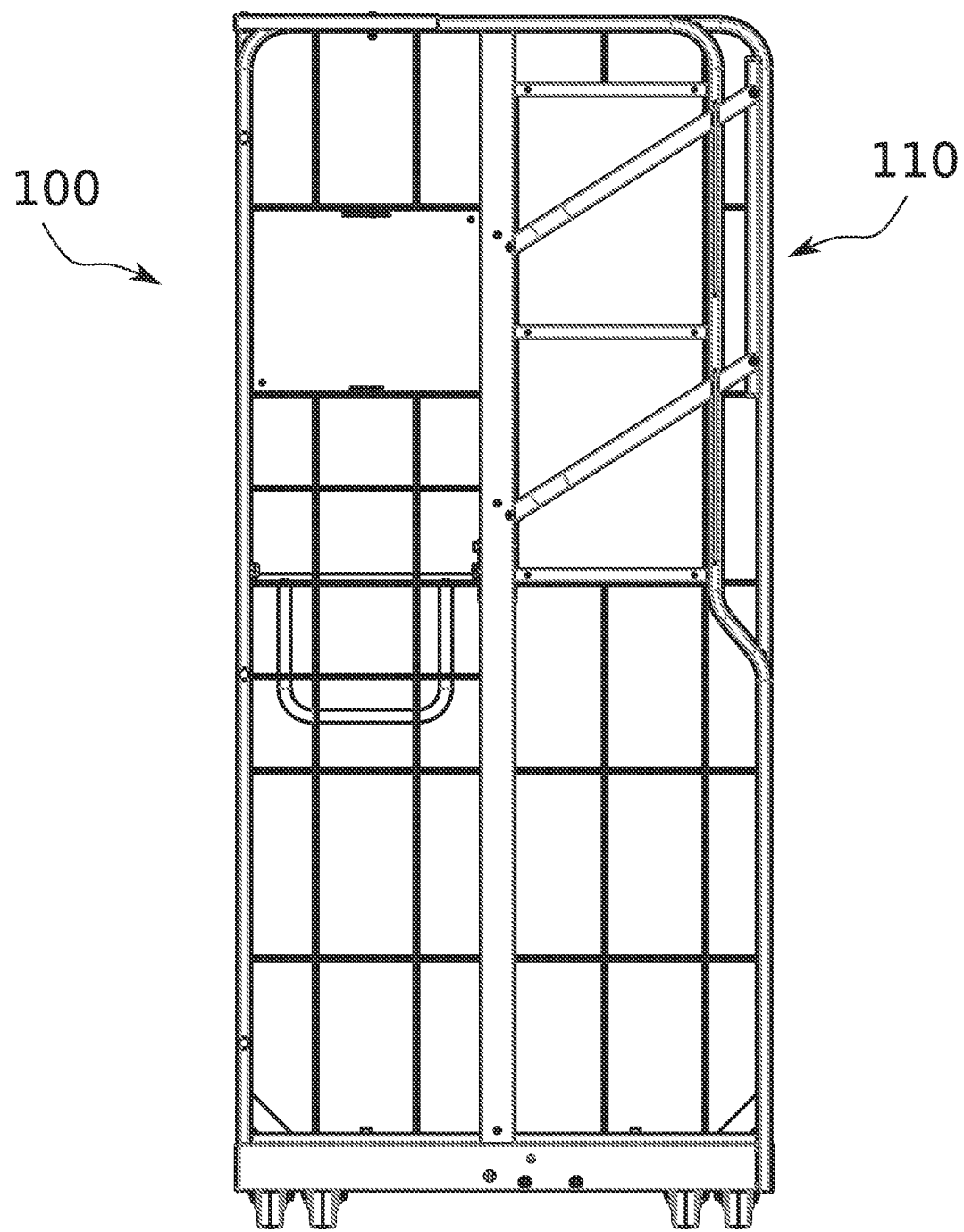
FIG. 2A illustrates a side view of the wheeled transport device of FIG. 1A in the applied state.
Figure 2B:
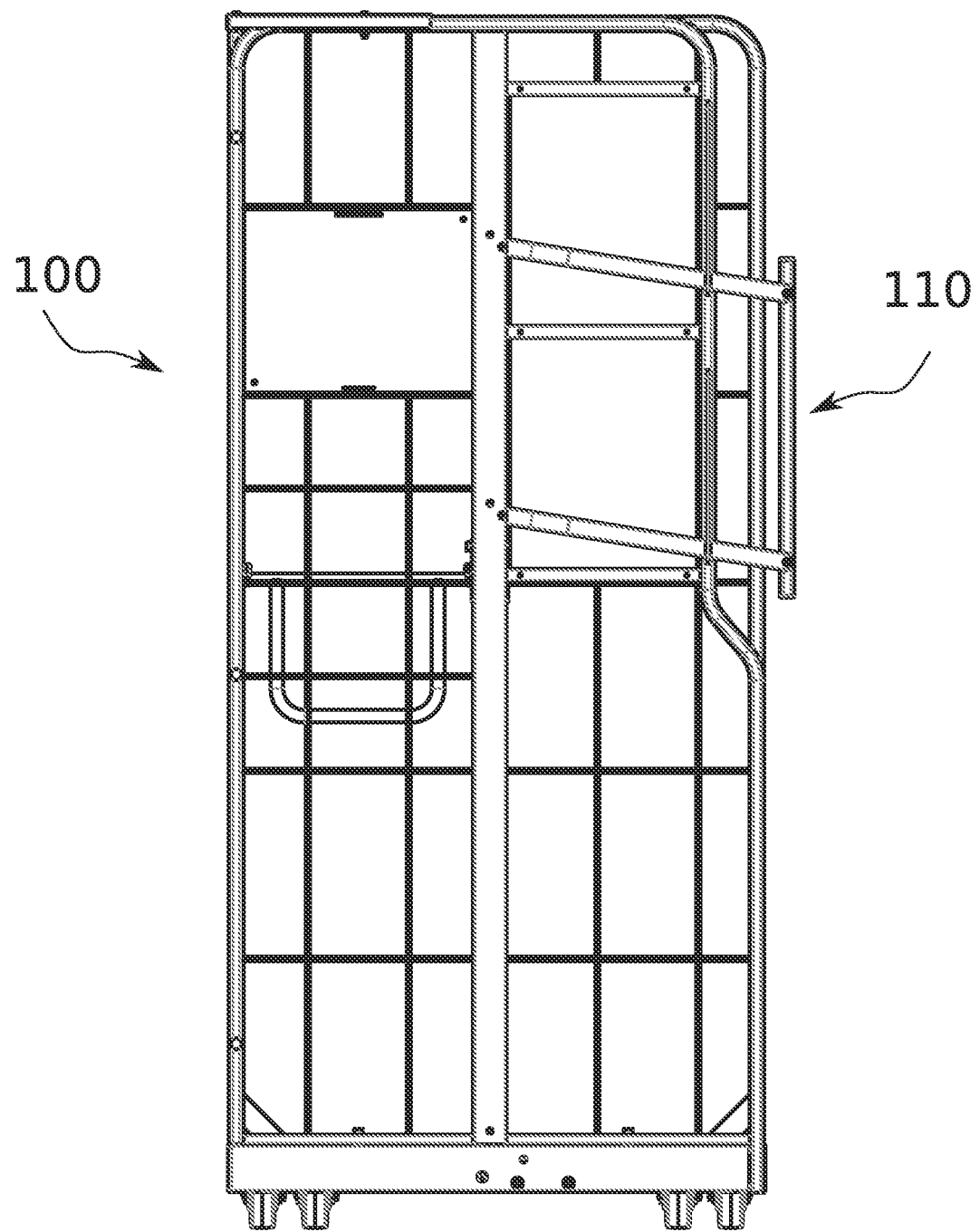
FIG. 2B illustrates a side view of the wheeled transport device of FIG. 1A in the released state.
Figure 5A:
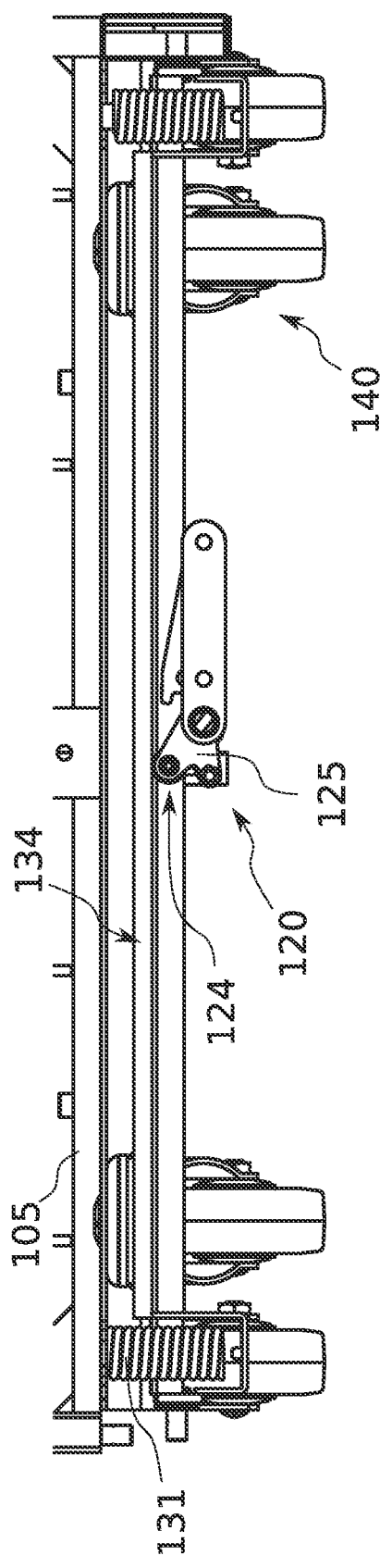
FIG. 5A illustrates a section view of the wheeled transport device of FIG. 1A in the applied state.
Figure 5B:
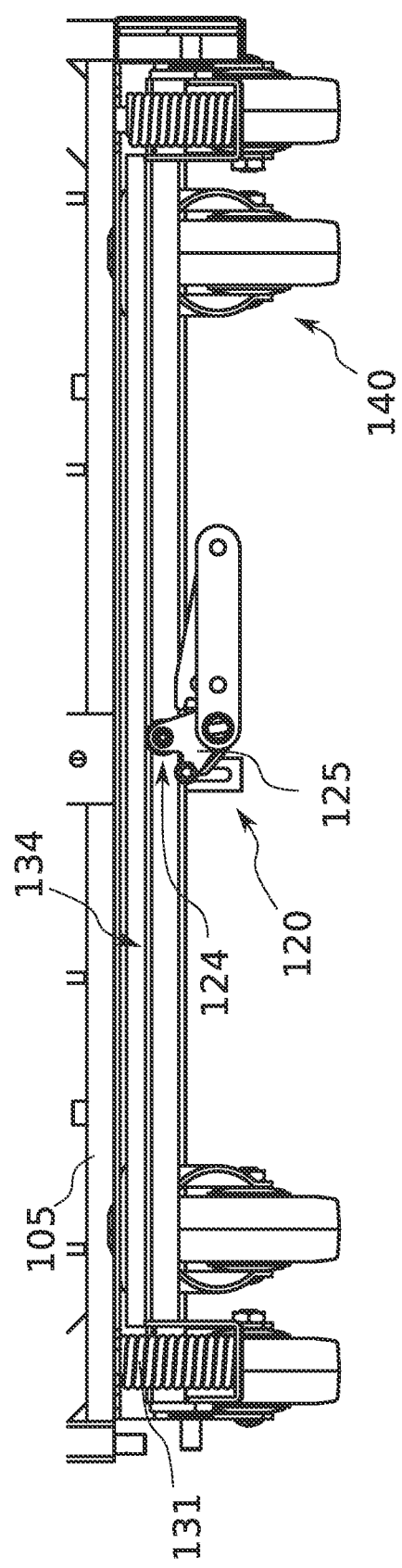
FIG. 5B illustrates a section view of the wheeled transport device of FIG. 1A in the released state.

FIG. 1A, FIG. 1B, FIG. 2A and FIG. 2B illustrate a wheeled transport device 100 according to an exemplary embodiment, with FIG. 5A and FIG. 5B showing a section view of the wheeled transport device 100. The wheeled transport device 100 has a frame 105 having a front side, a back side, a right side, a left side, and an upper section. According to this exemplary embodiment, the frame 105 is made of welded steel. The wheeled transport device 100 has a first handle 110 located in the upper section of the frame 105. FIG. 1A and FIG. 2A illustrate a first orientation of the first handle 110, namely an orientation where an operator is not engaging with the first handle 110. FIG. 1B and FIG. 2B illustrate a second orientation of the first handle 110, namely an orientation where an operator is engaging with the first handle 110.

FIG. 3A FIG. 3B, FIG. 4A, FIG. 4B, FIG. 6A, FIG. 6B, FIG. 7A and FIG. 7B illustrate the wheeled transport device 100 according to at least some embodiments. The wheeled transport device 100 has at least one castor 140. The wheeled transport device has a brake system 130 which can be in an applied state and a released state. According to at least some embodiments, the brake system 130 can be in a relieved mode where the brake system 130 is partially engaged, and a fully engaged mode where the brake system is fully engaged. The brake system 130 has a release mechanism 120. According to the illustrated embodiment, the brake system 130 has a first transmission line 121 connected to the first handle 110 at first end of the first transmission line 121. The first transmission line 121 is connected to a motion converter 125 at a second end of the first transmission line 121. According to the illustrated embodiment, the first transmission line 121 is mounted on the frame 105. According to at least some embodiments, the first transmission line 121 is in the form of a long and narrow piece of hardware having a hinged point at the first end and having a slot 123 at the second end.

Figure 4A:
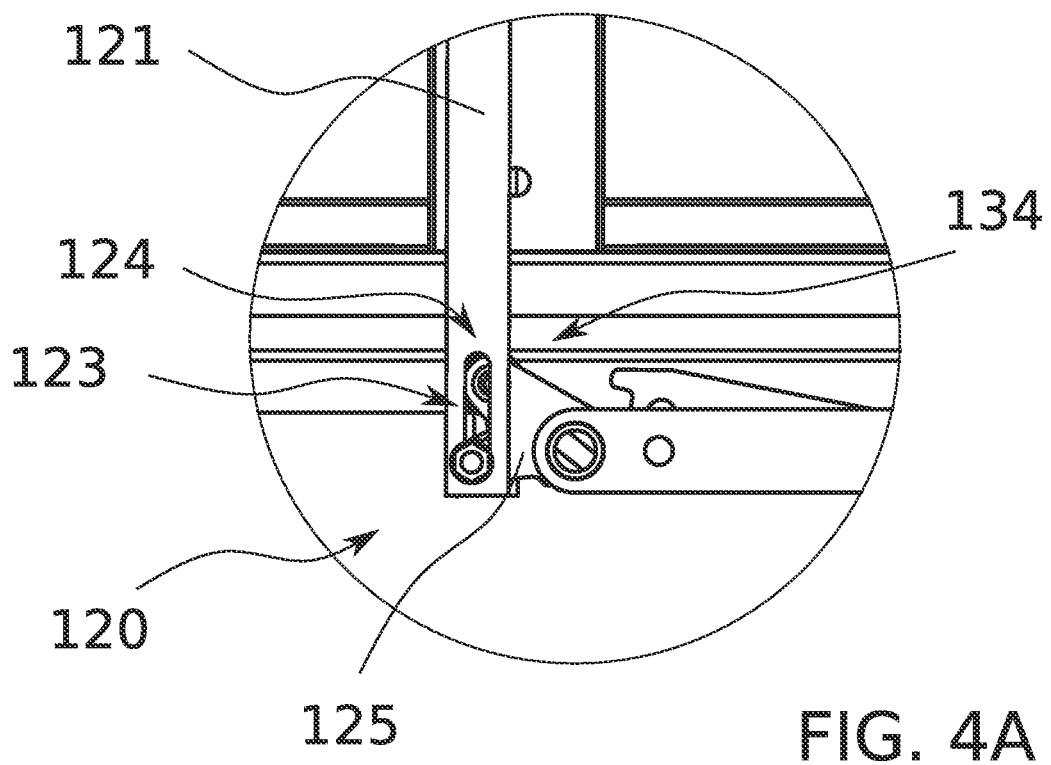
FIG. 4A illustrates a section view of the wheeled transport device of FIG. 3A in the applied state.
Figure 4B:
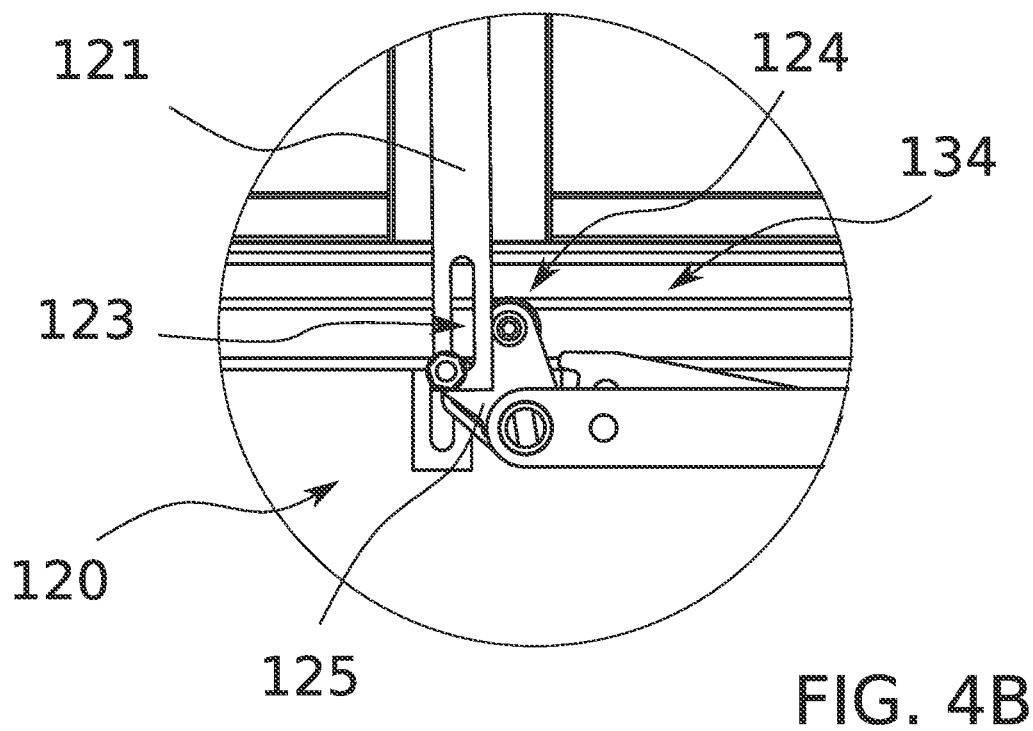
FIG. 4B illustrates a section view of the wheeled transport device of FIG. 3B in the released state.

FIG. 4A and FIG. 4B illustrate a side view of the wheeled transport device 100 according to at least some embodiments. The motion converter 125 is at least partially mounted to the frame 105 and may be connected to the frame 105 via a motion converter hinge. A section of the motion converter 125 is free to move with respect to the frame 105. The first transmission line 121 may be directly connected to the motion converter 125 and may be connected via the slot. The motion converter 125 is mechanically in contact with a contact member 134 at a motion converter connector 124. The brake system 130 comprises the contact member 134. According to at least some embodiments, the motion converter connector 124 is a ball bearing which has a ball bearing outer surface which is in contact with the contact member 134.

Figure 7A:
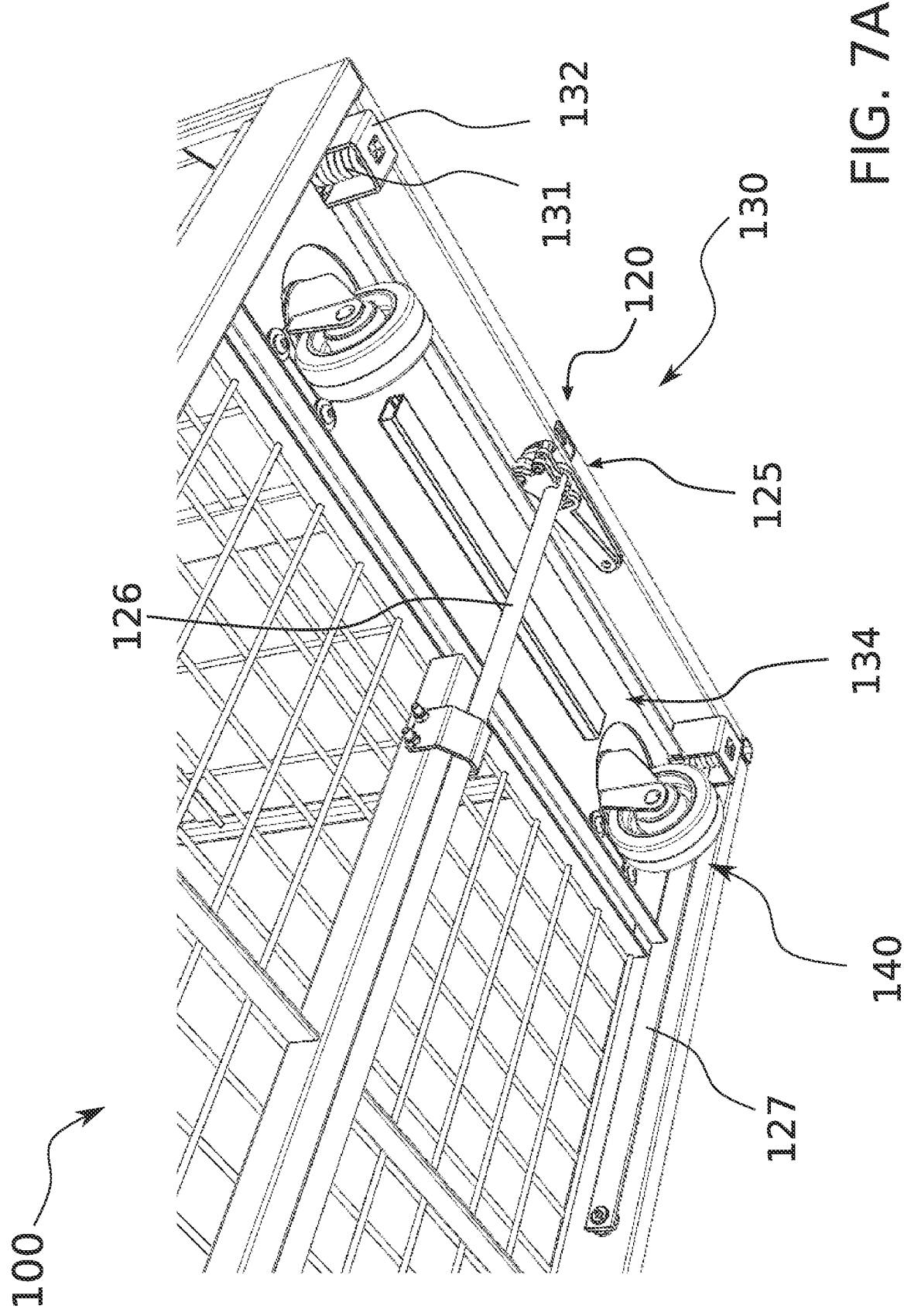
FIG. 7A illustrates a perspective section view of the wheeled transport device of FIG. 1A in the applied state.
Figure 7B:
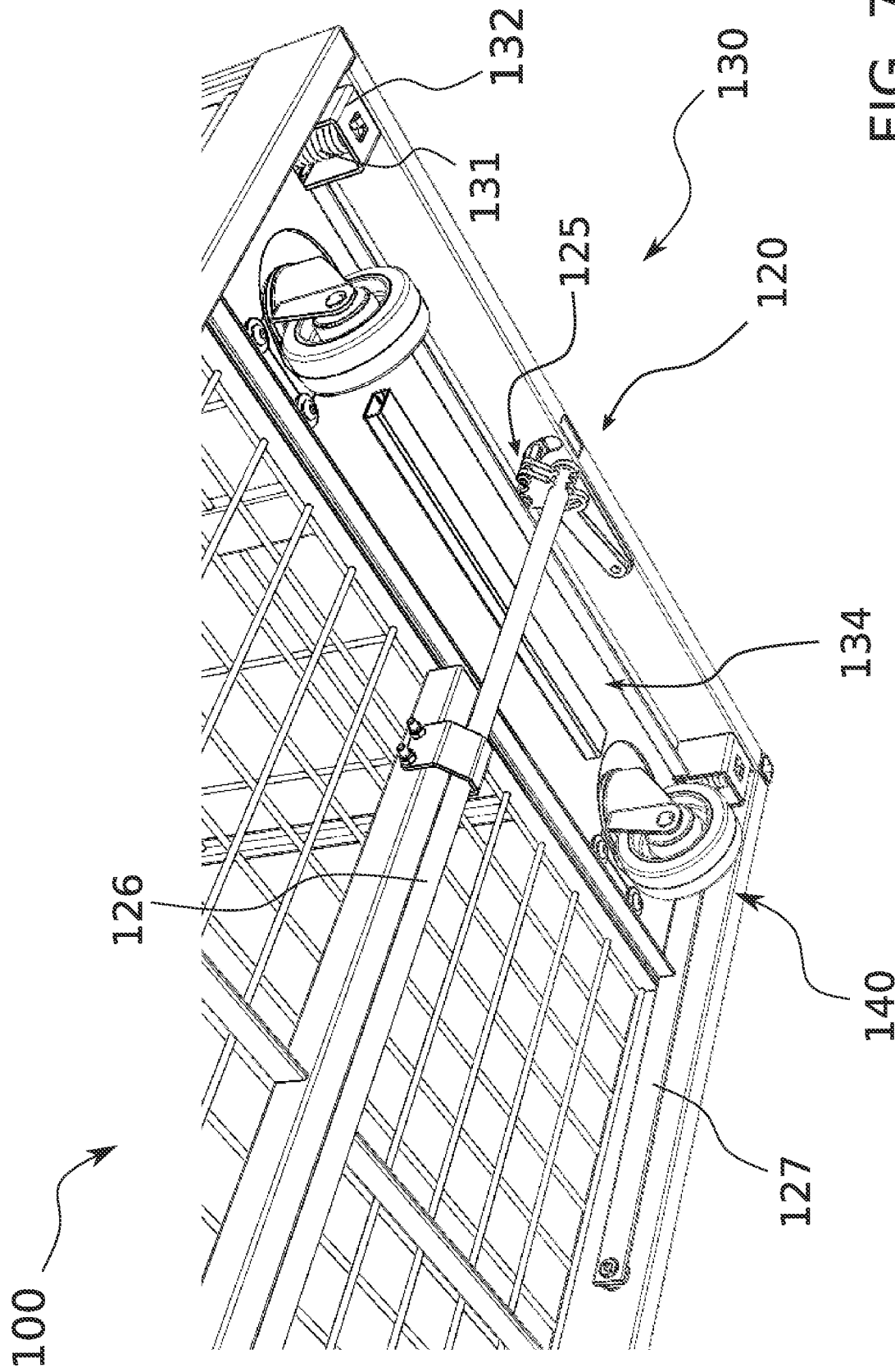
FIG. 7B illustrates a perspective section view of the wheeled transport device of FIG. 1A in the released state.

FIG. 7A and FIG. 7B illustrate a bottom view of the wheeled transport device 100 according to at least some embodiments. FIG. 5A and FIG. 5B illustrate a side section view of the wheeled transport device 100. The brake system 130 may have a shaft 126 that is connected to the motion converter 125 at a first end of the shaft 126. The brake system 130 comprises the contact member 134. The contact member 134 has a hinge mechanism 127 which connects the contact member 134 to the frame 105 via a contact member hinge. The hinge mechanism 127 may be a long and narrow piece of hardware which extends the body of the contact member 134. The release mechanism 120 has a biasing mechanism 131 housed in a biasing mechanism housing 132. The biasing mechanism 131 may be a compression spring. The biasing mechanism housing 132 is rigidly connected to the contact member 134. The biasing mechanism 131 is connected to the biasing mechanism housing 132 at a first biasing mechanism end and is connected to the frame 105 at a second biasing mechanism end.

Figure 8A:
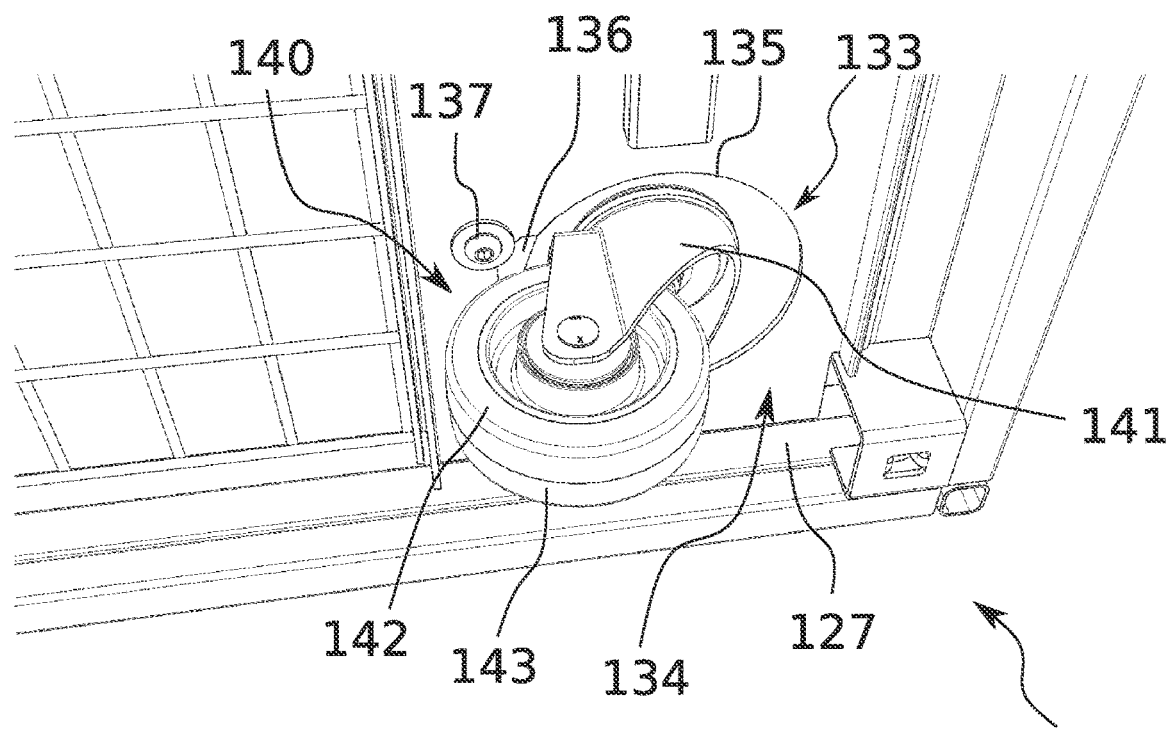
FIG. 8A illustrates a perspective section view of the wheeled transport device of FIG. 1A in the applied state.
Figure 8B:
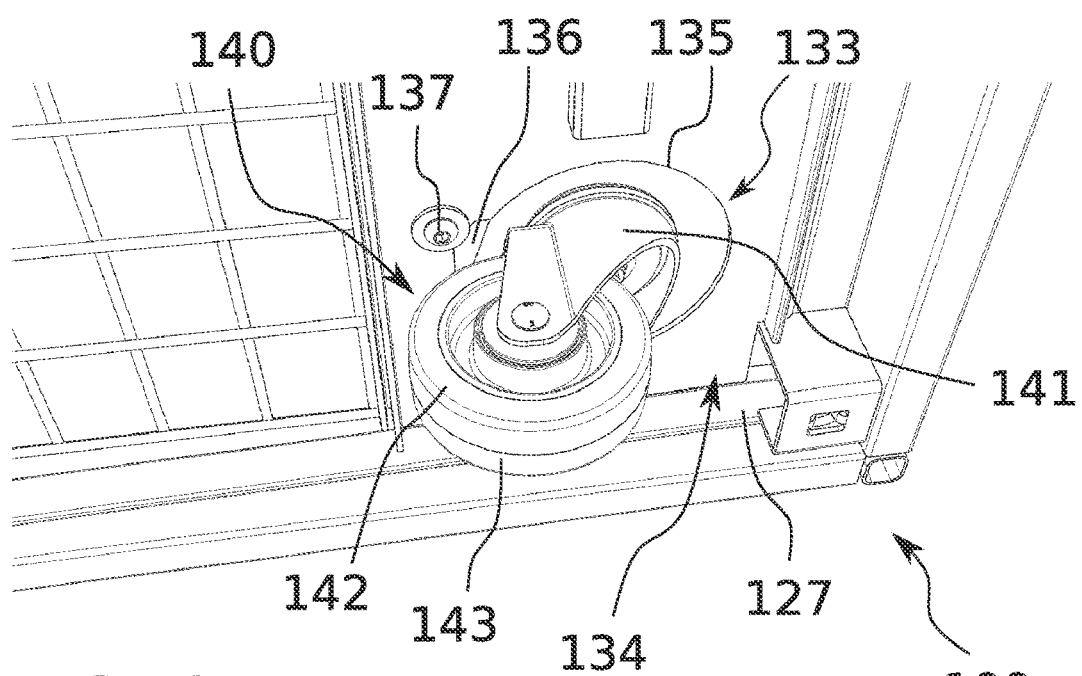
FIG. 8B illustrates a perspective section view of the wheeled transport device of FIG. 1A in the released state.

FIG. 8A and FIG. 8B illustrate a bottom view of the wheeled transport device 100 according to at least some embodiments. The castor 140 has a wheel 142 and a fork 141, where the fork is connected to the center of the wheel 142 and has a vertical axis of rotation. Located at the center of the wheel 142 is a wheel axle 144. The wheel 142 has a running surface 143 which is meant to be in contact with the floor. The running surface 143 may also come into contact with the edge 135 in the applied state. The fork 141 is axially connected to the frame 105, allowing at least a portion of the fork 141 to rotate relative to the frame 105 about its axis of rotation.

According to the illustrated embodiment FIG. 8A and FIG. 8B, the contact member 134 is a planar surface which is parallel or substantially parallel to a plane perpendicular to the axis of rotation of the fork 141 of the castor 140. The contact member 134 has an opening 133 defined by an edge 135. According the at least some embodiments, the opening 133 is in the shape of a circle. According to the illustrated embodiment of FIG. 8A and FIG. 8B, the area that defines the opening 133 may be parallel or substantially parallel to the plane perpendicular to the axis of rotation of the fork 141 of the castor 140. The size of the opening 133 may be determined based on a desired contact point on the wheel 142. That is, the size of the opening 133 may dictate where the edge is going to be in contact with the wheel 142. For swivel wheels that turn in all orientations of a span of 360 degrees, and with the opening 133 positioned concentrically with the axis of rotation of the fork 141, the radius of the opening 133 may range between x and y, where x is the radius of the fork 141 and y is about a distance calculated from the axis of rotation of the fork 141 to an outer edge of the wheel 142 minus ⅛ the diameter of the wheel 142. Another method of determining the size of the opening is to ensure that the edge 135 will be mechanically in contact with the wheel 142 when the brake system 130 is in the applied state.

According to the illustrated embodiment FIG. 8A and FIG. 8B, the edge 135 may have a replaceable brake pad 136. The brake pad 136 may be in contact with the castor 140 when the brake system 130 is in the applied state. The brake pad 136 may be positioned anywhere on the edge 135. The brake pad 136 may be positioned on a portion of the edge 135 where the castor 140 of that opening 133 is most likely to be positioned so that castor 140 is frequently being applied the brakes at the location where the brake pad 136 is. For example, the operator may push the wheeled transport device 100 in a forward direction and a swivel wheel may be trailing behind meaning it is positioned, with respect to the opening 133, opposite of the forward direction. Thus the brake pad 136 may be placed at this location so that the material of the edge 135 is not subject to a high cycle of wear and tear. Rather the brake pad 136 may be subject to a high cycle of wear and tear and may be replaceable for convenient maintenance. The brake pad 136 may span a portion of the edge 135 or may cover the entire edge 135. The brake pad 136 may be connected to the contact member 134 by a fastener 137, rivets, bolts, screws, or other connection known for replaceable brake pads.

Figure 9A:
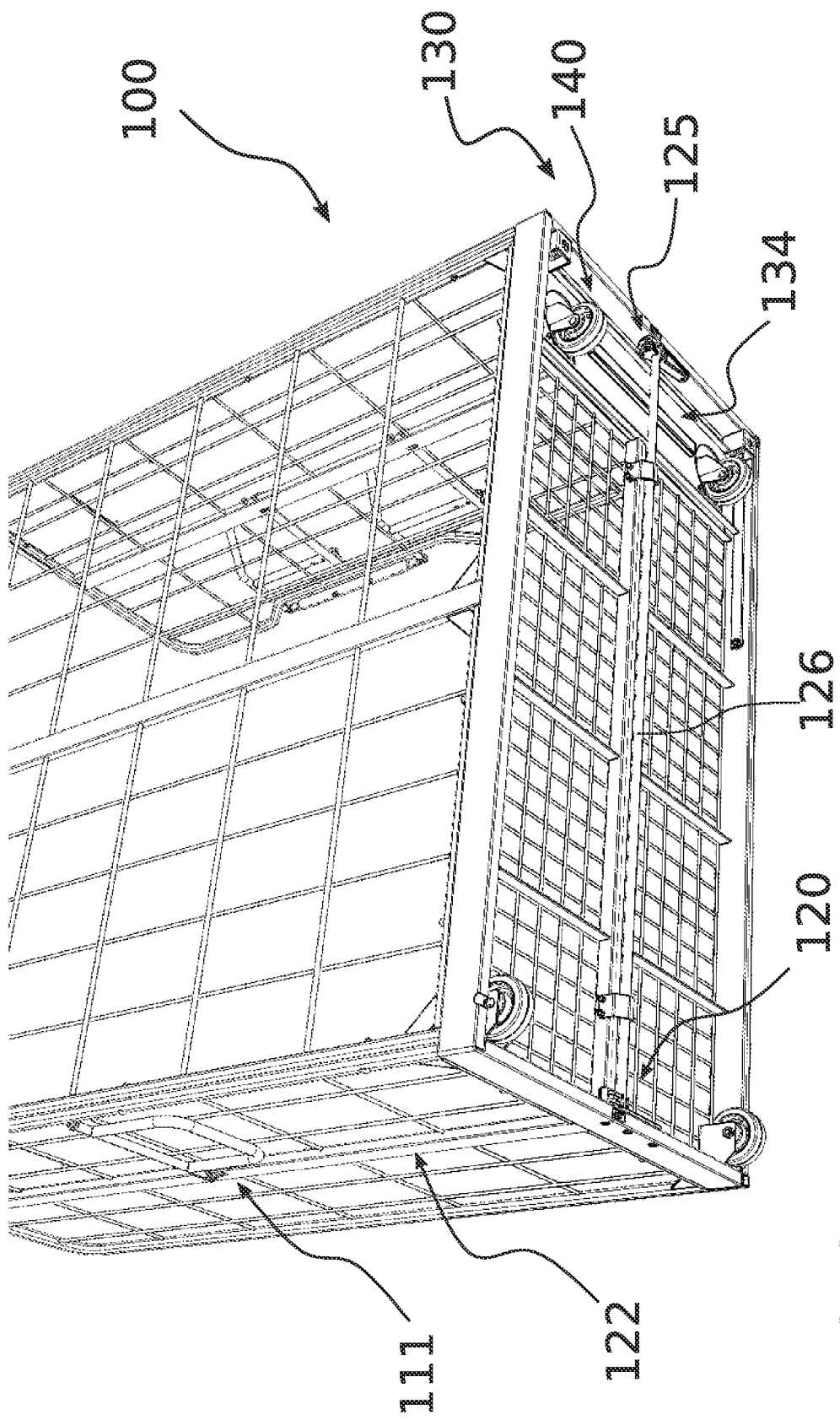
FIG. 9A illustrates a perspective view the wheeled transport device of FIG. 1A in the applied state.
Figure 9B:
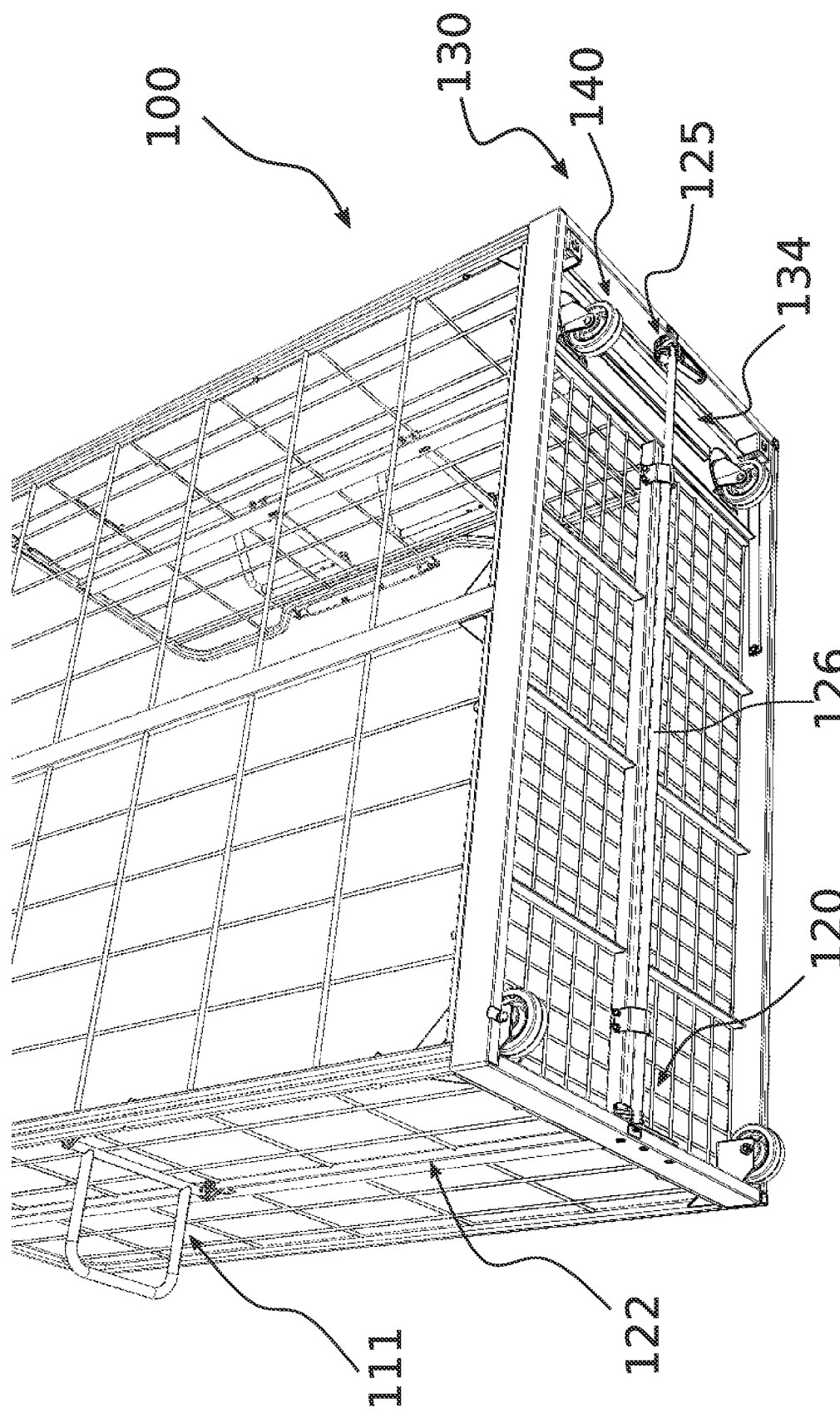
FIG. 9B illustrates a perspective view of the wheeled transport device of FIG. 1A in the released state.

FIG. 9A and FIG. 9B illustrate a bottom view of the wheeled transport device 100 according to at least some embodiments. The illustrated embodiments illustrate the shaft 126 be connected to a first end of the wheeled transport device 100 and a second opposite end of the wheeled transport device 100. According to the illustrated embodiment, the release mechanism 120 is located at the first and second ends of the wheeled transport device 100. The portion of the release mechanism 120 at the second end of the wheeled transport device 100 may have similar components, such as the motion converter 125, as the portion of the release mechanism 120 at the first end of the wheeled transport device 100. According to the illustrated embodiment, there is a contact member 134 at the first end of the wheeled transport device 100 and there is not a contact member 134 at the second end of the wheeled transport device 100. Other embodiments may have a contact member 134 at each of the first and second ends of the wheeled transport device 100. According to the illustrated embodiment, there is a second handle 111 and a second transmission line 122 at the second end of the wheeled transport device 100 so that an operator may use the second handle 111 to manipulate the brake system 130 between the applied state and the released state. The release mechanism 120 at the second end of the wheeled transport device 100 is connected to the second transmission line 122. The release mechanism 120 comprises the shaft 126 having two ends, each end connected to the release mechanism 120 at one of the ends of the wheeled transport device 100.

The following paragraphs describe the usage of components of the wheeled transport device 100.

As mentioned previously, FIG. 1A and FIG. 2A illustrate a first orientation of the first handle 110, namely an orientation where an operator is not engaging with the first handle 110 and FIG. 1B and FIG. 2B illustrate a second orientation of the first handle 110, namely an orientation where an operator is engaging with the first handle 110. When the wheeled transport device 100 is stationary and the first handle 110 is not engaged by an operator, the first handle 110 is in the first orientation and the brake system 130 is in the fully engaged mode. When an operator desires the wheels 142 to rotate and thus cause the wheeled transport device 100 to be in a transportation state, the operator can change the orientation of the first handle 110 from the first orientation to an intermediate or the second orientation. The intermediate orientation of the first handle 110 is an orientation where the first handle 110 is between the first orientation and the second orientation. When the first handle 110 is in the intermediate orientation, the contact member 134 is still in contact with the wheel 142, however the wheel 142 is able to rotate about the wheel axis 144. The change of the orientation of the first handle 110 may be accomplished by the operator grasping the first handle 110 with their hand and changing the orientation of the first handle 110 to the intermediate or the second orientation by rotating the first handle 110, for example. Thus, when the first handle 110 is in the second orientation, the brake system is in the released state.

When the first handle 110 rotates from a first orientation to an intermediate orientation, the first handle 110 causes the first transmission line 121 to manipulate the contact member 134. According to at least some embodiments, the first transmission line 121 is moved from a first transmission line position to an intermediate transmission line position. According to at least some embodiments, the first transmission line is moved from the first transmission line position to an intermediate transmission line position by moving upwards, thus causing a motion converter connector to be moved from a first connector position to an intermediate connector position. According to at least some embodiments, the motion converter connector is lifted by the slot 123, and the slot 123 rotates the motion converter 125. This causes the contact member 134 to be in the relieved mode from the fully engaged mode of the contact member 134.

The motion converter 125 may have a ball bearing which is mechanically in contact with the contact member 134. When the motion converter 125 is rotated, the motion converter connecter 124 may move where the ball bearing rolls on a bottom surface of the contact member 134. When the handle is moved from a first orientation to an intermediate orientation, and thus the transmission line 121 causes the motion converter to rotate, the motion converter connecter 124 pushes on the contact member 134. The contact member 134 is in contact with the wheel 142 and the force applied on the contact member 134 may relieve, at least partially, a braking force applied on the wheel 142.

While the contact member 134 is in the fully engaged mode and in the relieved mode, the contact member 134 is mechanically in contact with the wheel 142.

However, during the fully engaged mode, the wheel 142 is not able to rotate about the wheel axle 142 and therefore the wheeled transport device 100 is configured to be stationary. During the relieved mode, the contact member 134 is also mechanically in contact with the wheel 142, however the wheel 142 is able to rotate about the wheel axle 142 and therefore the wheeled transport device 100 is configured to be moved relative to the ground. When the handle 110, the transmission line 121 and the motion converter 125 are oriented from the first positions to the intermediate positions, the contact member 134 is in the relieved mode.

At some point when the first handle 110 is moved into or through the intermediate orientation, the wheel 142 will start to rotate about the wheel axle 144. This depends on a variety of factors, including but not limited to: the weight of the load on the wheeled transport device 100, the angle of the slope on which the wheeled transport device 100 is on and other factors.

Figure 3A:
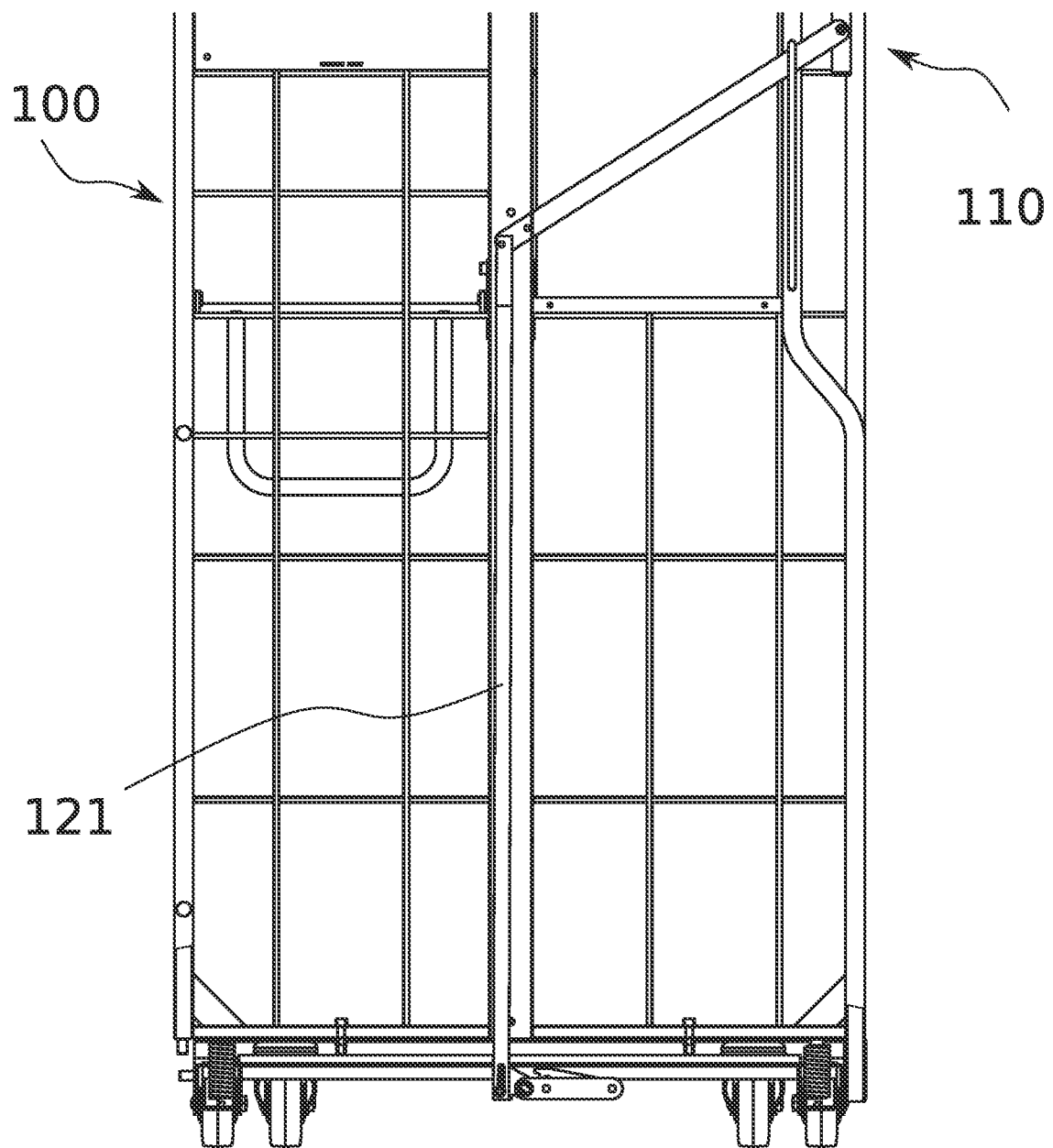
FIG. 3A illustrates a side section view of the wheeled transport device of FIG. 1A in the applied state.
Figure 3B:
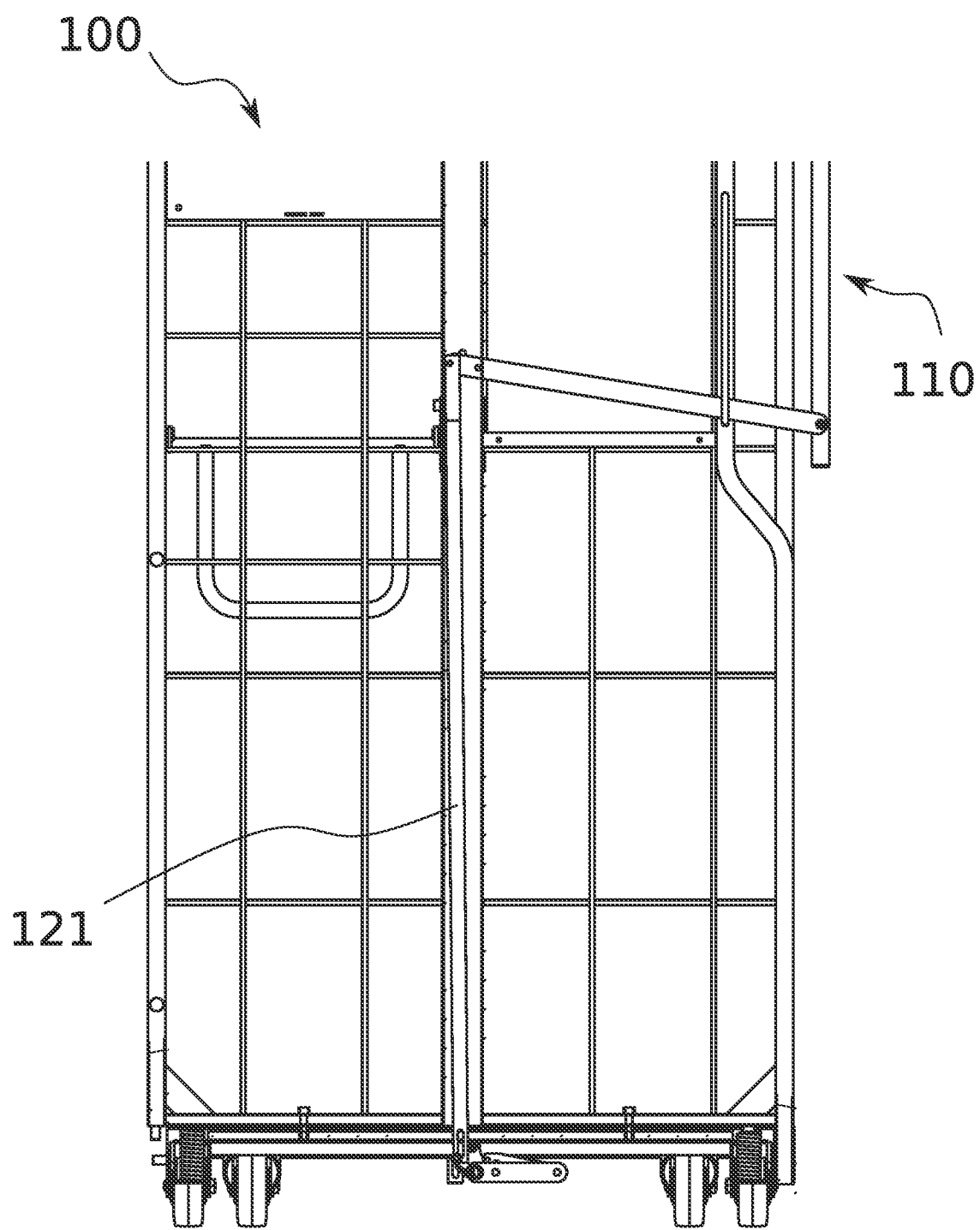
FIG. 3B illustrates a side section view of the wheeled transport device of FIG. 1A in the released state.

When the first handle 110 rotates from the intermediate to the second orientation, in which the second orientation is depicted in FIG. 1B FIG. 2B, and FIG. 3B, the first handle 110 causes the first transmission line 121 to manipulate the contact member 134 into the released state. The contact member 134 is moved upwards and may be rotated simultaneously. The contact member 134 is allowed to be rotated because of the hinge mechanism 127 which is connected to the frame. When the handle 110, the transmission line 121 and the motion converter 125 are oriented from the intermediate positions to the second positions, the contact member 134 is in the released state.

While the brake system 130, and thus the contact member 134 is in the released state, the motion converter 125 may rotate to a position before it reaches a maximum position, in which the maximum position is where the contact member connector 124 is vertically above a motion converter hinge connector. The motion converter hinge connector is the rotatable connection between the motion converter 125 and the frame 105. It is preferred that, while travelling from the applied state to the released state, the contact member connector 124 does not travel past the maximum position, so that the motion converter 125 is able to rotate back in the opposite direction, which is when the brake system 130 is moved from the released state to the applied state. According to at least some embodiments, the motion converter 125 rotates clockwise according to a view point while the brake system 130 is moved from the applied state to the released state and the motion converter 125 rotates counter-clockwise according to the same view point while the brake system 130 is moved from the released state to the applied state. According a different embodiment, the motion converter 125 rotates counter-clockwise according to the same view point while the brake system 130 is moved from the applied state to the released state and the motion converter 125 rotates clockwise according to the same view point while the brake system 130 is moved from the released state to the applied state.

Figure 6A:
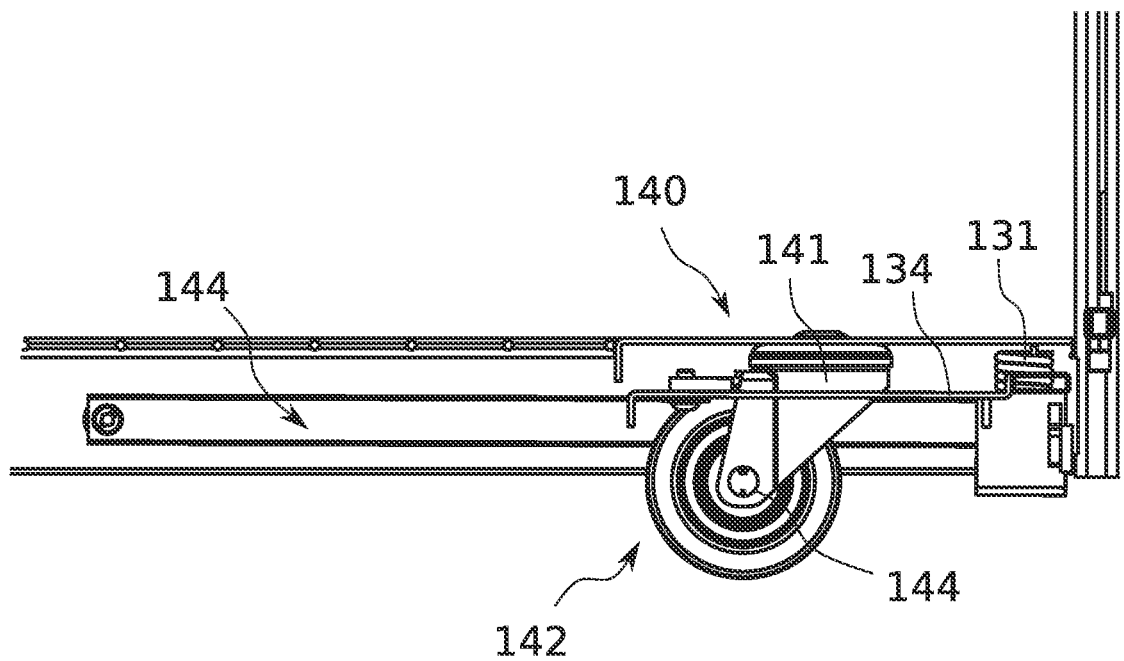
FIG. 6A illustrates a section view of the wheeled transport device of FIG. 1A in the applied state.
Figure 6B:
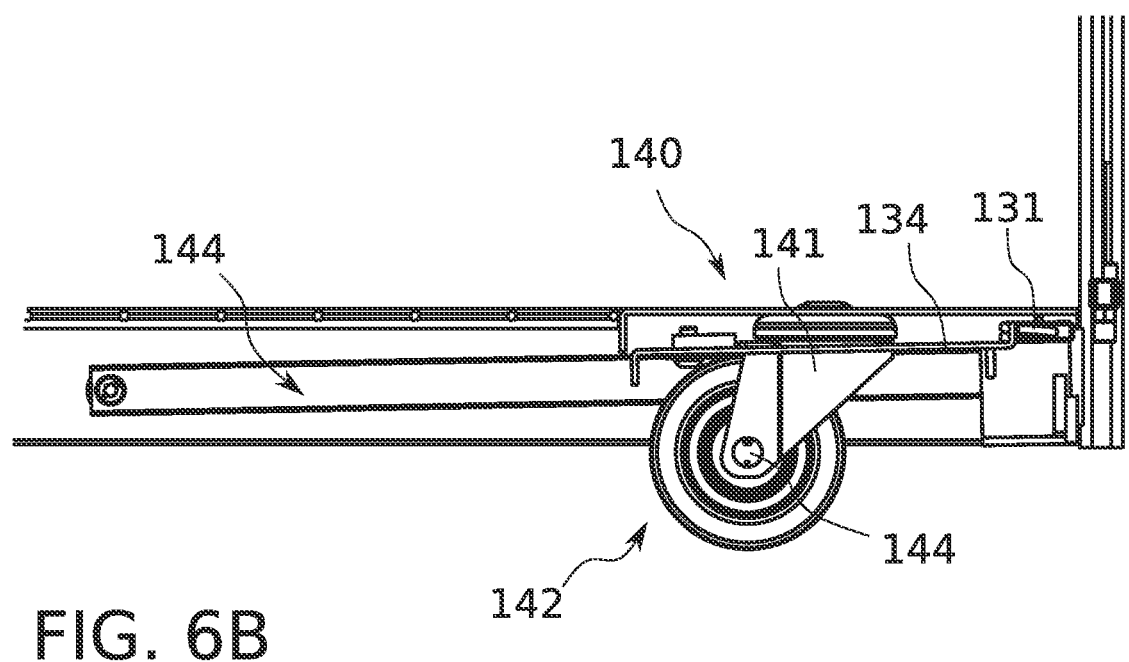
FIG. 6B illustrates a section view of the wheeled transport device of FIG. 1A in the released state.

According to at least some embodiments, manipulating the contact member 134 into the released state means that the contact member 134 moves upward at a distance away from the wheel 142. As depicted in FIG. 6B, FIG. 7B and FIG. 8B, the contact member 134 is at a distance from the wheel 142. More specifically, the edge 135 of the opening 133 of the contact member 134 is at a distance from the wheel 142. The edge 135 may have the brake pad 136 which is also at a distance from the wheel 142 while the contact member 134 is in the released state. When the edge 135 and thus the contact member 134 is at a distance from the wheel 142, the wheel 142 is able to rotate on a floor surface without any braking force applied from the contact member 134 and thus the wheeled transport device is able to be moved in a transportation state without any braking force applied on the wheels 142 from the contact member 134.

The operator may push or pull the wheeled transport device 100 while maintaining the first handle 110 in an orientation where the brake system 130 is in the released state or the relieved mode. The operator may travel or walk to a different location with the wheeled transport device 100 in the released state.

When the operator wishes to stop the wheeled transport device 100, the operator can release their grasp of the first handle or second handle 110, 111. At this point the first or second handle 110, 111 is changed from the second orientation to the first orientation due to a biasing force of the biasing mechanism. Here, the brake system 130 will automatically default to the fully engaged mode of the applied state due to the brake system 130 being biased to cause the contact member 134 to come into contact with the wheel 142 with a high enough braking force caused by the biasing mechanism to cause the wheel 142 to stop rotating about the wheel axle 144.

After the operator releases the first handle 110 and thus the first handle 110 is in the first orientation, the first handle 110 causes the first transmission line 121 to manipulate the contact member 134 into the applied state. Alternatively, the operator may keep a grasp on the first handle 110 and, in a controlled manner, move the handle 110 from the first orientation to an intermediate orientation of the handle 110.

According to at least some embodiments, manipulating the contact member 134 into the applied state means that the contact member 134 is biased to translate downwards and make contact with the wheel 142. As depicted in FIG. 6A, FIG. 7A and in FIG. 8A, the contact member 134 is in contact with the wheel 142. More specifically, the edge 135 of the opening 133 of the contact member 134 is in contact with the wheel 142. The edge 135 may have the brake pad 136 which is thus also in contact with the wheel 142 while the contact member 134 is in the applied state. When the edge 135 and thus the contact member 134 is in contact with the wheel 142, the wheel 142 is unable to rotate on the floor surface and thus the wheeled transport device 100 is unable to be transported. Further, the fork 141 is also prevented from rotating about its vertical axis of rotation. The wheeled transport device 100 is therefore not in a transportation state.

The contact member 134 is biased to translate downwards and make contact with the wheel 142 due to a biasing mechanism 131. According to at least some embodiments, the biasing mechanism 131 is in the form of a spring. During the released state, the biasing mechanism 131 is in compression and is making a connection between the contact member 134 and the frame 105. As the operator maintains the first handle 110 in the second orientation, the first handle 110 and the first transmission line 121 applies a force to the biasing mechanism 131 to keep the biasing mechanism 131 compressed at a first biasing force and therefore the contact member is at a distance away from the wheel 142. When the operator releases the first handle 110, the contact member 134 is in contact with the wheel 142 in the fully engaged mode and the biasing mechanism 131 is compressed at a second biasing force which is less that the first biasing force. The second biasing force is applied onto the biasing mechanism housing 132 which is connected to the contact member 134 and therefore the contact member applies a braking force to the wheel 142. The position of the biasing mechanism 131 contributes to the braking force. For example, if the edge 135, where the edge 135 is connected to the wheel 142, is located farther from the biasing mechanism 131 and closer to the rotatable connection between the frame 105 and the hinge mechanism 127, the braking force would be more due to the biasing and moment forces.

When the operator manipulates the handle 110, 111 into the intermediate handle position, the biasing force applied from the biasing mechanism 131 is now less than the first biasing force and greater than the second biasing force. However, since operator is applying force onto the handle, the braking force applied on the wheel 142 during the relieved mode may still be less than the braking force during the fully engaged mode.

A handle force is the force required by the operator in order to maintain the handle and brake system 130 in the released state, and thus prevent the release mechanism 120 from biasing to the applied state. A maximum biasing force is the force applied by the biasing mechanism 131 while the brake system 130 is in the fully engaged mode. According to a least some embodiments, a ratio of the handle force to the maximum biasing force is 1:30 or less, i.e. 1 to more than 30. According to another embodiment, the ratio of the handle force to the maximum biasing force is 1:50 or less. According to another embodiment, the ratio of the handle force to the max biasing force is 1:100 or less.

This may be an adequate ratio to enable the operator to maintain the handle in a released state to transport the wheeled transport device 100 comfortably for a certain period of time, while still exerting enough braking force onto the wheel 142.

The second handle 111 may cause the release mechanism 120 to be manipulated between the applied and released state. The second handle 111 is a second option to cause the release mechanism 120 to be manipulated between the applied and released state. In other words, if an operator manipulates the second handle 111 between a first and second orientation of the second handle 111, the contact member 134 can be in the released and applied state, without having to engage the first handle 110 between a first and second orientation.

According to at least some embodiments, the operator may engage with the second handle 111 and thus cause a second transmission line 122 to move a second motion converter at the second end of the wheel transport device 100. When the second motion converter is rotated, the shaft 126 is rotated and causes the motion converter 125 at the first end of the wheeled transport device 100 to manipulate the contact member 134 to the relieved mode or the released state.

The second handle 111 may manipulate the contact member 134 is the same or similar manner as the first handle 110 manipulates the contact member 134. The first handle 110 may be manipulated and the second transmission line 122 and the second handle 111 will not be affected or moved by this manipulation. Further, the second handle 111 may be manipulated and the first transmission line 121 and the first handle 110 will not be affected or moved by this manipulation. This is achieved by the slot 123 of each of the first and second transmission lines 121, 122.

In an example usage, the end result of releasing the first or second handle 110, 111 into a released orientation, is to release the contact member 134 from the wheel 142 or cause the brake system 130 to be in the released state. The operator may also manipulate the first or second handle 110, 111 in an intermediate orientation which allows the user to control the braking force on the wheel 142 and where the contact member 134 may still be in contact with the wheel 142.

The wheeled transport device 100 may have a platform for loading parcels or other objects. The height of the platform relative to the ground is found to be lower than common roll containers because the common brakes for swivel castors are located above the top surface of the castor in common roll containers. The contact member 134 in the proposed wheeled transport device 100 may be located below the top surface of the castor 140 as depicted in FIG. 6B. The contact member 134 may be located near the top surface of the wheel 142 while in the released state. Since there is not an obstruction above the top surface of the castor 140, the platform of the wheeled transport device 100 may be installed on the top surface of the castor 140 or immediately below it. This feature provides for more space for loading and unloading objects on the wheeled transport device 100.

The benefit of the contact member having an opening is that a wheel, especially a swivel wheel may have a brake applied to it in any orientation of the swivel wheel.

The benefit of automatically engaging the brake system 130 is that the operator can complete other tasks without having to manually apply a brake. For example, the operator may stop the wheeled transport device 100, step away from the wheeled transport device 100, load a box onto the wheeled transport device 100 and engage with the first or second handle 110, 111 to continue moving the wheeled transport device 100 and during this process, once the operator releases the first or second handle 110, 111, the wheeled transport device 100 has a brake system applied to prevent the wheels 142 from moving. This improves the overall efficiency of handling goods where wheeled transport devices are common. Additionally, the auto-engaging brake system 130 ensures that when the operator is away from the wheeled transport device 100, the wheeled transport device 100 is secured and not prone to unintentional movement of the wheeled transport device 100 due to the wheeled transport device 100 being on a sloped surface for example.

A person skilled in the art may foresee several variants of the above described embodiment.

For example, another embodiment comprises the frame 105 without the upper section. The handle may be lower and therefore, the upper section of the frame 105 may not comprise the handle.

The handle 110, 111 may be located in a lower section of the frame 105. The wheeled transport device 100 may have more than one castor 140. The castors may swivel and all or at least one of the castors may swivel.

According to at least some embodiments, the wheeled transport device 100 has only one handle and therefore the shaft 126 is not necessary. As a result, the wheeled transport device 100 may not have the second handle, the second transmission line, a second motion converter and the shaft 126. The wheeled transport device 100 may have a motion converter that does not rotate. Alternatively, the wheeled transport device 100 may not have a motion converter and the transmission line 121 may be directly connected to the contact member 134.

The transmission lines 121, 122 may be a cable, a bar or other form or transmitting movement or energy or motion to the release mechanism 120 or to the contact member 134 directly. The handles 110, 111 may be directly connected to the release mechanism 120, thus the wheeled transport device 100 may not have a transmission line.

The motion converter 125 may not be part of the release mechanism 120. The contact member 134 may be a planar surface, or curved surface.

The wheeled transport device 100 may not have the biasing mechanism housing 132 and the biasing mechanism 131 may be directly connected to the contact member 134. The biasing mechanism 131 may be a spring, a gas damper or a known component for exerting a force that stores energy in compression or tension or other biasing components known per se.

The contact member may move upwards or downwards between the applied and released states since the contact member may be located above or below a center axle of the wheel 142.

The opening 133 may be circular or slightly circular. The shape of the opening 133 may accommodate the possible orientations in which the wheel 142 is subject to be in. For example, if a wheeled transport device 100 has a wheel 142 that can rotate 180 degrees, as opposed to 360 degrees for a standard swivel wheel, the opening may be in a shape of a semicircle or slightly larger to accommodate for the entire movement of the swivel wheel.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

REFERENCE SIGNS LIST

| NO. | FEATURE |
|-----|---------|
| 100 | wheeled transport device |
| 105 | frame |
| 110 | first handle |
| 111 | second handle |
| 120 | release mechanism |
| 121 | first transmission line |
| 122 | second transmission line |
| 123 | slot |
| 124 | contact member connector |
| 125 | motion converter |
| 126 | shaft |
| 127 | hinge mechanism |
| 130 | brake system |

| NO. | FEATURE |
|---|---|
| 131 | biasing mechanism |
| 132 | biasing mechanism housing |
| 133 | opening |
| 134 | contact member |
| 135 | edge |
| 136 | brake pad |
| 137 | fastener |
| 140 | castor |
| 141 | fork |
| 142 | wheel |
| 143 | running surface |
| 144 | wheel axle |

The invention claimed is:

1. A wheeled transport device comprising:
at least one castor, which comprises a wheel, and
a brake system, which comprises a contact member, which comprises at least one opening, which is defined by an edge, wherein the contact member is configured to be manipulated between:
an applied state, in which the edge is in contact with the wheel, and
a released state, in which the edge is not in contact with the wheel, wherein the brake system comprises a biasing mechanism connected to the contact member, wherein the biasing mechanism comprises a biasing mechanism first end and a biasing mechanism second end wherein:
the biasing mechanism first end is connected to the contact member,
the biasing mechanism second end is connected to a frame, and
the biasing mechanism is configured to bias the contact member relative to the frame.

2. The wheeled transport device according to claim 1, wherein the brake system comprises a release mechanism configured to selectively manipulate the brake system to the released state.

3. The wheeled transport device according to claim 1, wherein the at least one castor is a swivel castor, and wherein the castor is aligned or centered with respect to the opening so that the edge can engage the wheel in each orientation of the at least one castor while the brake system is in the applied state.

4. The wheeled transport device according to claim 1, wherein the wheel comprises a running surface and wherein the edge is mechanically in contact with the running surface while in the applied state, and wherein the edge is at a distance from the running surface while in the released state.

5. The wheeled transport device according to claim 4, wherein the running surface partially extends through the opening in the applied state.

6. The wheeled transport device according to claim 1, wherein the castor comprises a fork which extends, at least partially, through the opening.

7. The wheeled transport device according to claim 2, wherein the release mechanism is connected to the contact member via a motion converter such that the motion converter allows the contact member to be manipulated between the applied state and the released state.

8. The wheeled transport device according to claim 7, wherein the motion converter is configured to rotate and cause the contact member to be manipulated between the applied state and the released state.

9. The wheeled transport device according to claim 7, wherein the release mechanism comprises a hinge mechanism configured to rotate the contact member between the applied state and the released state.

10. The wheeled transport device according to claim 1, wherein the wheeled transport device comprises one contact member, and at least two swivel wheels, wherein the contact member is configured to engage with the at least two swivel wheels.

11. The wheeled transport device according to claim 1, wherein the edge comprises a replaceable brake pad.

12. The wheeled transport device according to claim 11, wherein the brake pad spans between 5% and 40% of the perimeter of the edge.

13. The wheeled transport device according to claim 2, wherein the wheeled transport device comprises a first handle at one end of the wheeled transport device configured to manipulate the release mechanism.

14. The wheeled transport device according to claim 13, wherein the wheeled transport device comprises a second handle at another end of the wheeled transport device configured to manipulate the release mechanism.

15. The wheeled transport device according to claim 1, wherein the applied state of the contact member further comprises:
a fully engaged mode, the contact member exerts a first braking force onto the running surface, and
a relieved mode, in which the contact member exerts a second braking force onto the running surface, which second braking force is less than the first braking force.

16. The wheeled transport device according to claim 13, wherein the first handle is configured to modulate the brake system between the fully engaged mode and the relieved mode.

17. The wheeled transport device according to claim 13, wherein the first handle and the second handle are configured to modulate the brake system between the fully engaged mode and the relieved mode.

18. The wheeled transport device according to claim 1, wherein the brake system is configured to default into the applied state.

19. The wheeled transport device according to claim 1, wherein the biasing mechanism is configured to bias the contact member to the applied state.

20. The wheeled transport device according to claim 2, wherein the release mechanism comprises a shaft wherein:
the shaft is connected to a first transmission line and a first handle at a first shaft end,
the shaft is connected to a second transmission line and a second handle at a second shaft end, and
the second handle is configured to manipulate the release mechanism to manipulate the brake system between the released state and the applied state.

21. The wheeled transport device according to claim 20, wherein the shaft is configured to cause the motion converter according to claim 7 to be toggled between the released state and the applied state.

* * * * *